United States Patent [19]

Flack et al.

[11] Patent Number: 5,659,465

[45] Date of Patent: Aug. 19, 1997

[54] PEAK ELECTRICAL POWER CONVERSION SYSTEM

[75] Inventors: Albert J. Flack, Grove; Michael D. Vail, Glendora, both of Calif.

[73] Assignee: Aeroviroment, Inc., Monrovia, Calif.

[21] Appl. No.: 311,740

[22] Filed: Sep. 23, 1994

[51] Int. Cl.$^6$ ............................................. H02J 7/10
[52] U.S. Cl. .................... 363/71; 320/2; 323/906; 363/79
[58] Field of Search ............... 363/71, 78, 79, 363/123; 320/2; 323/906, 299; 136/291, 293; 307/38, 45, 66, 82

[56] References Cited

U.S. PATENT DOCUMENTS

| | | | |
|---|---|---|---|
| 3,384,806 | 5/1968 | Hartman . | |
| 3,489,915 | 1/1970 | Engelhardt . | |
| 3,609,502 | 9/1971 | Burkett | 320/5 |
| 4,375,662 | 3/1983 | Baker | 363/95 |
| 4,390,940 | 6/1983 | Corbefin et al. | 363/132 |
| 4,404,472 | 9/1983 | Steigerwald | 307/46 |
| 4,445,049 | 4/1984 | Steigerwald | 307/45 |
| 4,468,569 | 8/1984 | Norris | 290/1 R |
| 4,636,931 | 1/1987 | Takahashi et al. | 363/71 |
| 4,638,236 | 1/1987 | Carr et al. | 320/21 |
| 4,649,334 | 3/1987 | Nakajima | 323/299 |
| 4,695,785 | 9/1987 | Mieth et al. | 323/222 |
| 4,847,546 | 7/1989 | Bobier et al. | 320/21 |
| 4,873,480 | 10/1989 | Lafferty | 323/229 |
| 4,916,382 | 4/1990 | Kent | 323/299 |
| 5,151,865 | 9/1992 | Blessing et al. | 364/483 |
| 5,291,388 | 3/1994 | Heinrich | 363/98 |
| 5,327,066 | 7/1994 | Smith | 320/2 |

*Primary Examiner*—Peter S. Wong
*Assistant Examiner*—Adolf Berhane
*Attorney, Agent, or Firm*—Pretty, Schroeder, Brueggemann & Clark

[57] ABSTRACT

An electrical power conversion system that supplies the maximum available output power from a power source such as a solar array to a plurality of loads such as rechargeable batteries. The output power of the solar array peaks at an optimum current that is less than is maximum available output current. The system includes a controller and a plurality of dc-to-dc converters that charge the batteries. The controller monitors the solar array's output power and adjusts the battery charging by generating a current control signal that tracks a peak of the solar array's available output power and sets a current limit such that the combined current draw of the plurality of dc-to-dc converters is substantially equal to the solar array's optimum current at which it provides its maximum available power. The electrical power and control signals are transmitted from the power source and controller to the power converters on three bus bars, including a power bus, a control bus, and a common bus. The current control signal and the voltage control signal are multiplexed onto the single control bus. The controller and the dc-to-dc converters are mounted on planar printed circuit boards having clips arranged in a triangular pattern that allow the dc-to-dc converters to be easily attached to and removed from the buses.

18 Claims, 6 Drawing Sheets

PEAK ELECTRICAL POWER CONVERSION SYSTEM

BACKGROUND OF THE INVENTION

This invention relates generally to electrical power conversion systems and, more particularly, to electrical power conversion systems that track the output power of an electrical power source to cause the power source to supply its peak available output power.

Some electrical power sources have the limitation that the maximum output power of the power source occurs at an output current less than its full output current. More specifically, the output power of such power sources increases as the output current increases until an optimum output current is reached whereupon further increases in the output current decreases the output power of the power source. For these power sources, the impedance of the electrical load desirably is controlled so that the power source operates at its optimum current. Often, the peak available output power is related to a variable energy source so that the optimum output current is not constant. Thus, the power load should have a variable impedance that tracks the power source's point of peak output power to allow the power load to consume the maximum available power as the energy source varies.

For example, a solar array manufactured from a plurality of photovoltaic solar cells has an output power defined by the product of its output voltage and output current. The relationship between the output voltage and output current of the solar array, at constant insolation, is well known and is generally defined by a knee-shaped curve. The solar array produces its peak output power near the corner of the knee-shaped curve, where the product of its output voltage and output current is maximized. If the current is increased past the optimum output current, such that the output current approaches the solar array's maximum or full output current, the solar array's output voltage decreases more rapidly than the output current increases. This sharp voltage reduction decreases the product of the solar array's output voltage and output power, causing a net decrease in the solar array's output power.

The solar array's actual operating output voltage and output current is defined by the impedance of the electrical power load. Thus, the power load's impedance usually is set to maximize the solar array's output power.

It is well known that changes in the insolation collected by the solar array and in the solar array's temperature cause the knee-shaped curve of the solar array to shift. Thus, the power load's impedance should be adjustable to accommodate any changes in the solar array's peak available output power. More specifically, on a sunny day at noon, a fixed power load impedance typically is set to cause the power load to draw the maximum available output power from the solar array. However, on a cloudy day, the maximum available output power will be reduced. In addition, the power load will draw less than the maximum available power output of this reduced output power unless its load impedance is appropriately adjusted to track the shift in the peak operating point of the solar array.

The size of the solar array is a significant factor in determining the cost of the electrical energy delivered by a solar electrical power source. Tracking the solar array's peak operating point allows for more efficient use of the solar array which lowers the cost of the electrical energy.

Accordingly, solar battery charging systems or the like have been developed that adjust the impedance of the power load connected to the solar array to track the peak of the available output power as the insolation on the solar array changes. Frequently, the power load is a dc-to-dc converter that varies the current drawn from the solar array until the impedance of the dc-to-dc converter causes it to draw the maximum available power from the solar array.

Often, the electrical power load is a well-defined load of known characteristics and the power converter is designed to interface a specific power source with a specific electrical power load. For example, the power source may be a solar array and power load may be a battery or an electrical motor.

However, it may be desired to have the solar array supply power to many separate and removable power loads or to several different load types. For example, it may be desired to have the solar array configured to simultaneously charge several different battery types or to power a mix of batteries and motors. Also, it may be desired to disconnect one or more of the power loads from the solar array. Controlling the system so as to draw the peak available power therefore becomes substantially more complicated.

From the foregoing, it should be apparent that there is a need for an electrical power conversion system that can supply electrical power to a plurality of varied and removable electrical power loads while controlling the current draw of the power loads such that, in combination, the power loads consume the maximum available power from a variable power source such as a solar array. The present invention satisfies this need.

SUMMARY OF THE INVENTION

The present invention is embodied in an electrical power conversion system for delivering the maximum available output power to a plurality of electrical power loads from a power source, such as a solar array or the like, that has an output power that varies with changes in its output current such that its output power peaks at an optimum current that is less than the maximum available output current of the power source. The conversion system controls the total current draw of the power loads such that, in combination, the power loads draw the maximum available power from the power source.

In one embodiment of the invention, the electrical power conversion system includes a voltage sensor, a current sensor, a controller, and a plurality of electrical power converters. The voltage sensor monitors the output voltage of the power sources and generates an output voltage signal based on the output voltage. The current sensor monitors the output current of the power source and generates an output current signal based on the output current. The controller calculates the output power of the power source based on the output voltage signal and the output current signal and generates a current control signal associated with the calculated output power. The plurality of electrical power converters are associated with the plurality of power loads. Each power converter receives the current control signal and draws current from the power source in accordance with a predetermined current limit set by the current control signal. The controller tracks a peak in the available output power of the power source and sets the predetermined current limit of the current control signal such that the combined current draw of the plurality of power converters is substantially equal to the optimum current, thereby allowing the power converters, in combination, to consume the maximum available power from the power source.

The plurality of power converters may be dc-to-dc converters. The dc-to-dc converters are useful in charging lead-acid batteries or the like.

In a more detailed feature of the invention, the electrical power conversion system also includes a temperature sensor that monitors the ambient temperature of the plurality of electrical power loads and generates a temperature signal based on the temperature. The controller monitors the temperature signal and generates a voltage control signal based on the temperature signal. The plurality of converters set a load voltage for the converter's respective power load based on the voltage control signal.

In another more detailed feature of the invention, the controller combines the voltage control signal and the current control signal to form a bi-phase pulse control signal. The load voltage is represented by the amplitude of a first signal polarity of the bi-phase pulse control signal and the predetermined current limit is represented by the amplitude of a second signal polarity of the bi-phase pulse control signal. Further, the predetermined limit of the current control signal may represent a current threshold and each of the plurality of power converters reduces its current draw from the power source if the current draw of the respective power converter is greater than the current threshold.

In another feature of the invention, the electrical power conversion system includes a power bus for transmitting output power from the power source to the plurality of power converters, a control bus transmitting the current control signal from the controller to the plurality of power converters, and a common bus that serves as a return for the power bus and the control bus. The three buses are spaced apart from each other such that they are parallel and coplanar. Further, the power loads typically are associated with a planar circuit board having first, second, and third clips on one side. The clips are spaced apart in a triangular configuration and engageable with the three buses. The controller may be similarly configured with such a printed circuit board.

In one embodiment of the invention, the system provides electrical energy to individuals living at locations near a charging site. The system includes a plurality of rechargeable energy storage devices such as batteries, a solar electrical power source, and a battery charging assembly. The plurality of rechargeable batteries are distributed to the individuals and are physically transportable between the charging site and the various locations at which the individuals reside or work. The solar electrical power source is located at the charging site and converts solar energy to electrical energy. The battery charging assembly is located at the charging site and is configured to simultaneously connect to one or more of the plurality of batteries and to charge the connected batteries using electrical energy provided by the solar electrical power source. The battery charging assembly charges the connected batteries based upon one or more monitored conditions of the connected batteries and based upon the performance of the solar electrical power source, such that the battery charging assembly maximizes the use of electrical energy from the solar electrical power source when charging the connected batteries. The monitored conditions can include the state of charge of each battery and the ambient temperature at the battery charging site.

Other features and advantages of the present invention should be apparent from the following description of the preferred embodiment, taken in conjunction with the accompanying drawings, which illustrate, by way of example, the principles of the invention.

DESCRIPTION OF THE PREFERRED EMBODIMENTS

Figure 1:
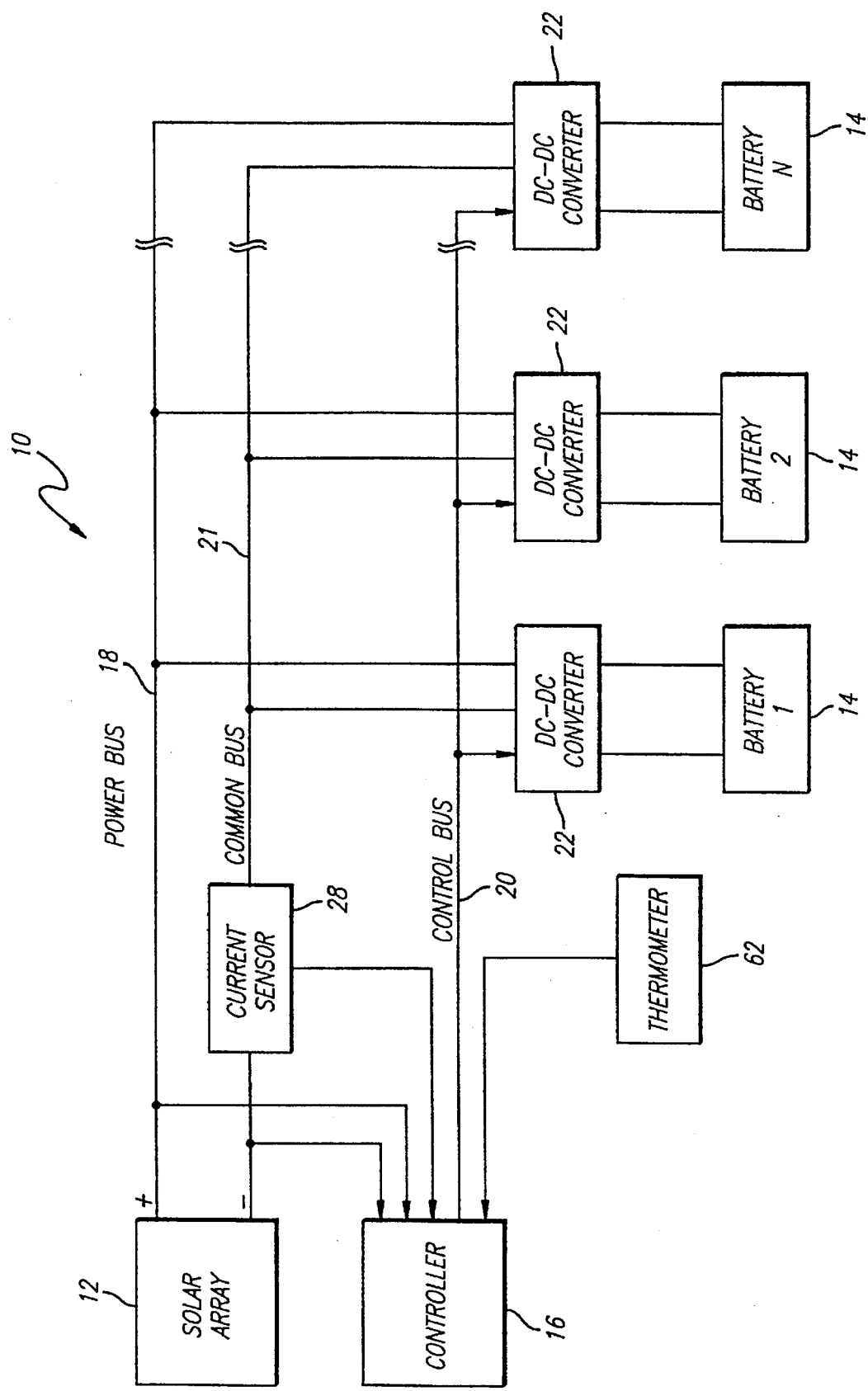
FIG. 1 is a block diagram of an electrical power conversion system of the present invention having a solar panel, a controller and a plurality of dc-to-dc converters.

As shown in the exemplary drawings, the present invention is embodied in an electrical power conversion system, generally referred to by the reference numeral 10, for use in delivering the maximum available output power from a power source to a power load. Referring to FIG. 1, an electrical power conversion system 10, in accordance with the present invention, is shown connected between a solar array 12 and a plurality of batteries 14. The electrical power conversion system includes a controller 16, a power bus 18, a control bus 20, a common bus 21, and a plurality of dc-to-dc converters 22. Each dc-to-dc converter charges a separate one of the plurality of batteries.

The power conversion system 10 allows for the independent charging of multiple removable batteries 14 that can have different discharge levels. In typical operation, any number of discharged batteries can be added to the system and charged batteries can be removed from the system at any time. The controller 16 does not gather any information regarding the charge status of the individual batteries. Instead, the controller monitors the output power of the solar array 12 and controls the combined current draw of the dc-to-dc converters 22 from the solar array by providing an appropriate control signal to the dc-to-dc converters via the control bus 20. The solar array preferably includes 40 solar panels, each typically producing a maximum output power of 24 watts that peaks at an optimum current of 0.75 amps at maximum insolation. The system controls the dc-to-dc converters to adjust their draw of output current from the array in response to insolation changes.

When the system 10 is operating at the optimum current, adding a dc-to-dc converter to the system to charge a completely discharged battery would increase the current draw from the solar array, which would decrease the array's output power. The controller senses such a decrease in the array's output power and returns the system to the optimum current level by incrementing the control signal until it encounters a peak in the array's output power. The dc-to-dc converters are then again drawing the maximum available power from the solar array.

The batteries 14 are charged at a constant current until their voltage approaches a float voltage, whereupon the batteries float at a trickle charge current until removed from the system 10. A battery's float voltage depends on the battery's type and temperature. For example, a lead-acid battery typically has a float voltage that varies from about 14.7 volts at 15 degrees Fahrenheit to about 12.7 volts at 120 degrees Fahrenheit. Accordingly, the controller also monitors the ambient temperature and provides information to the dc-to-dc converters 22 regarding the appropriate float voltage based on the temperature. Preferably, the float voltage information is included in the control signal provided to the dc-to-dc converters via the control bus 20.

Figure 2:
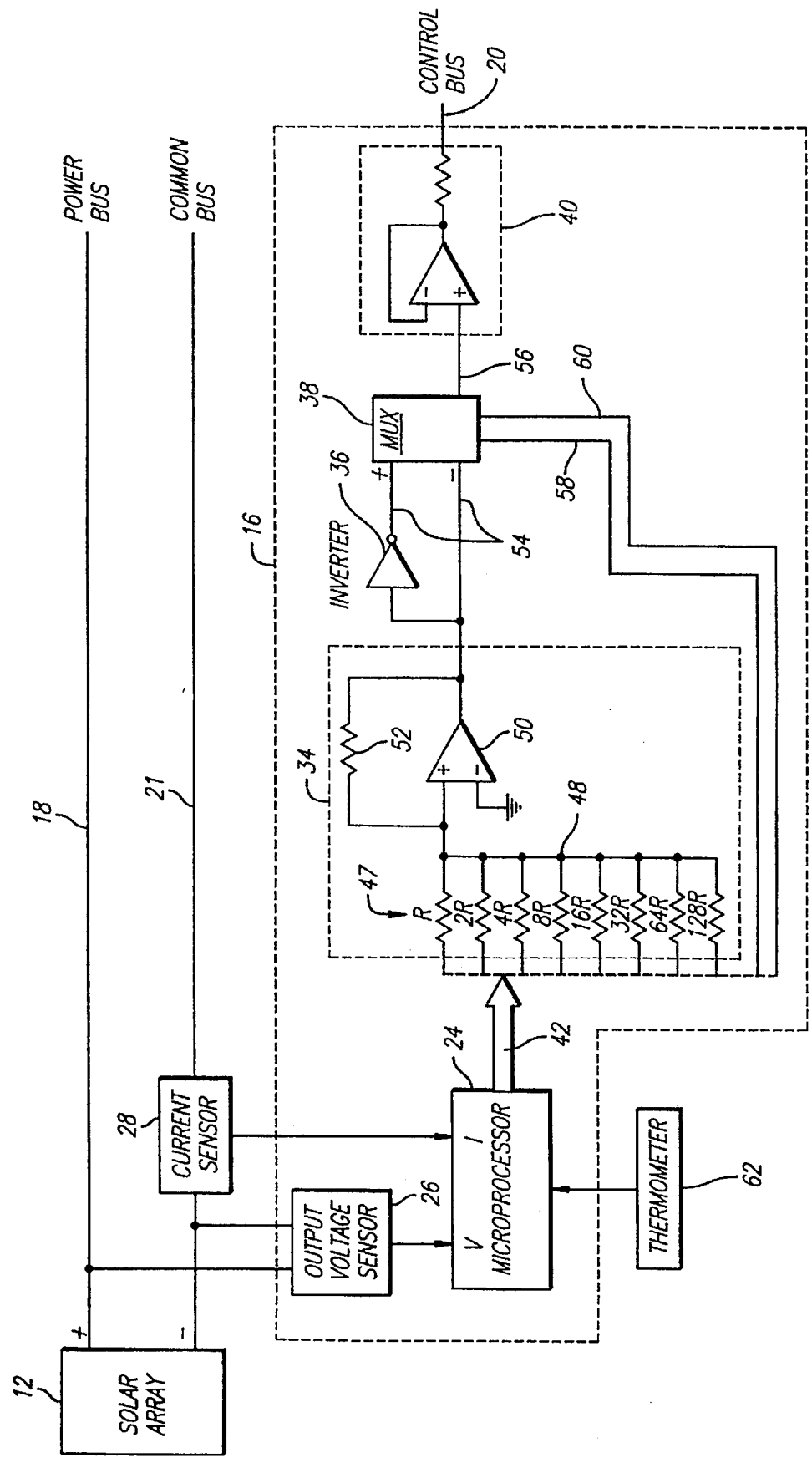
FIG. 2 is a block diagram of the controller of the electrical power conversion system of FIG. 1.
Figure 2A:
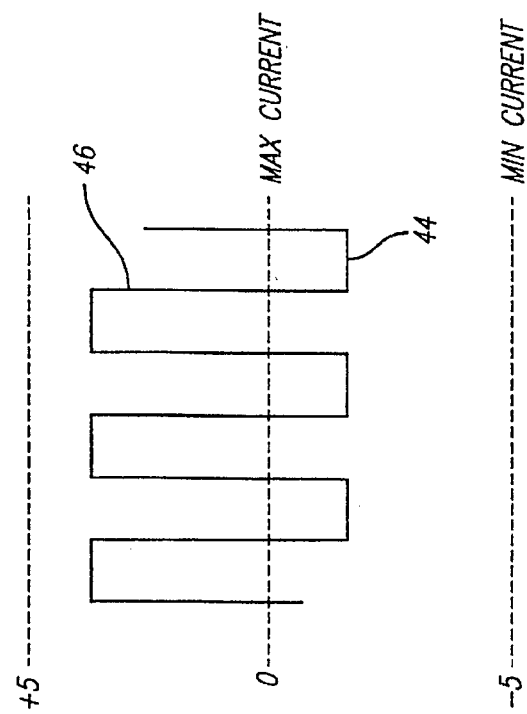
FIG. 2A is a graph of a typical control signal generated by the controller of FIG. 2 and provided to the plurality of dc-to-dc converters.

The operation of the controller 16 is most conveniently described with reference to FIGS. 2, 2A and 4. The controller includes a microprocessor 24 and accompanying circuitry that monitor the output current and output voltage of the solar array 12 and provide a control signal to the dc-to-dc converters 22 via the control bus 20. More particularly, a voltage sensor 26 measures the solar array's output voltage, and a current sensor 28 measures the solar array's output current. The current sensor 28 can include a brass ribbon (not shown) of low resistance, e.g., 20 milliohms, connected in series with the common bus 21, which serves as the return for the power bus 18, and can further include a shunt voltage sensor (not shown) for measuring the voltage drop across the brass ribbon. The voltage measurement from the voltage sensor 26 and the current measurement from the current sensor 28 are transmitted on lines 30 and 32, respectively, to the microprocessor 24. The microprocessor implements an algorithm (shown in FIG. 4 and discussed below) to produce the control signal that is provided to the dc-to-dc converters 22, for setting the battery charging current and the battery float voltage.

Preferably, the control bus 20 is a single conductor, and the control signal (FIG. 2A) is a multiplexed bi-phase pulse signal that includes alternating positive float voltage pulses and negative maximum current pulses. The controller 16 produces this control signal using circuitry that includes a digital-to-analog (D/A) converter 34, an inverter 36, a multiplexer 38, and a line buffer 40. More specifically, the microprocessor 24 has ten output lines 42 used to generate the control signal. Eight of the output lines are connected to the D/A converter. The microprocessor places a digital word or number associated with the desired level of the control signal on the eight output lines. The other two output lines are connected to the multiplexer and are used to multiplex the desired signal polarity onto the single wire of the control bus 20.

More particularly, the control signal (FIG. 2A) includes a maximum current pulse 44 having a negative voltage amplitude and a float voltage pulse 46 having a positive voltage amplitude. The negative voltage amplitude of the maximum current pulse represents a current draw and the positive voltage amplitude of the float voltage pulse represents a float voltage level to the dc-to-dc converters 22. For reasons to be discussed later, a maximum current pulse having an amplitude of zero voltage sets the dc-to-dc converters to draw maximum current while a maximum current pulse having an amplitude of −5.0 volt sets the dc-to-dc converters to draw a minimum or zero current. Similarly, a float voltage pulse having an amplitude of +5.0 volts sets the float voltage to a maximum value while a float voltage pulse having an amplitude of 0 volts signal sets the float voltage to a minimum value.

The microprocessor 24 sets the positive and negative amplitudes of the control signal by generating an eight bit word on the eight output lines mentioned before. Each of these eight output lines is connected to one of the input resistors of a resistor array 47 of the digital-to-analog converter 34. The input resistors are each connected to a summing node 48 of an operational amplifier 50 having a feedback resistor 52. The resistors in the resistor array and the feedback resistor are sized to implement the desired conversion system. For example, to implement binary conversion of the digital word, the first input resistor of the resistor array and the feedback resistor have a standard resistance value R, the second input resistor has a value of 2R, the third input resistor has a value of 4R and so on until the eighth input resistor that has a value of 128R. Thus, the resistors have a binary relationship that define 256 steps allowing 0.4% increments in the analog signal of the digital-to analog converter. The inverter 36 inverts the analog signal to provide a negative analog signal.

The multiplexer 38 has two input lines 54, an output line 56, an enable input line 58, and a select input line 60. One input line of the multiplexer is directly connected to the output of the D/A converter 34, and the other input line is connected to the output of the inverter 36. Accordingly, the multiplexer receives the positive amplitude pulses of the analog signal at one input line and the negative amplitude pulses of the analog signal at the other input line.

In operation, the microprocessor 24 places a binary number representing the desired amplitude of float voltage pulse 46 on the eight output lines and sets the select input line 60 so that the multiplexer 38 will select the positive analog signal for the output on the multiplexer output line 56. The microprocessor then toggles the enable input line 58 to place the positive analog pulse or signal on the multiplexer output line. The microprocessor then places a binary number representing the desired amplitude of the maximum current pulse 44 on the eight output lines and sets the select input line so that the multiplexer will select the negative voltage signal for output on the multiplexer output line. The microprocessor then toggles the multiplexer's enable input line to place the negative voltage pulse or signal on the multiplexer output line. After the microprocessor places the binary number on the eight lines and sets the select input line, the microprocessor provides a short delay before toggling the enable input line of the multiplexer to allow the digital-to-analog converter 34 to settle thus avoiding voltage spikes on the control bus 20. This process of setting the maximum current pulse and the float voltage pulse is repeated every 50 milliseconds. The buffer amplifier 40 merely receives the control signal on the multiplexer output line and drives the control bus with the control signal.

When a battery 14 is fully charged, the charge current is reduced to a trickle charge until the battery is removed from the system. Accordingly, the dc-to-dc converter 22 must have an indication of the battery's float voltage, to prevent damage to the battery and to extend the battery's useful life. This float voltage is known to vary with ambient temperature. An electronic thermometer 62, such as a thermistor, is provided to measure the ambient temperature (T) and to provide a temperature signal to the controller 16. Using the temperature signal, the controller adjusts the amplitude of the float voltage pulse 46 to indicate the appropriate float voltage to the plurality of dc-to-dc converters 22. In this connection, it is assumed that all of the batteries have a temperature at or near the measured ambient temperature T.

Figure 4:
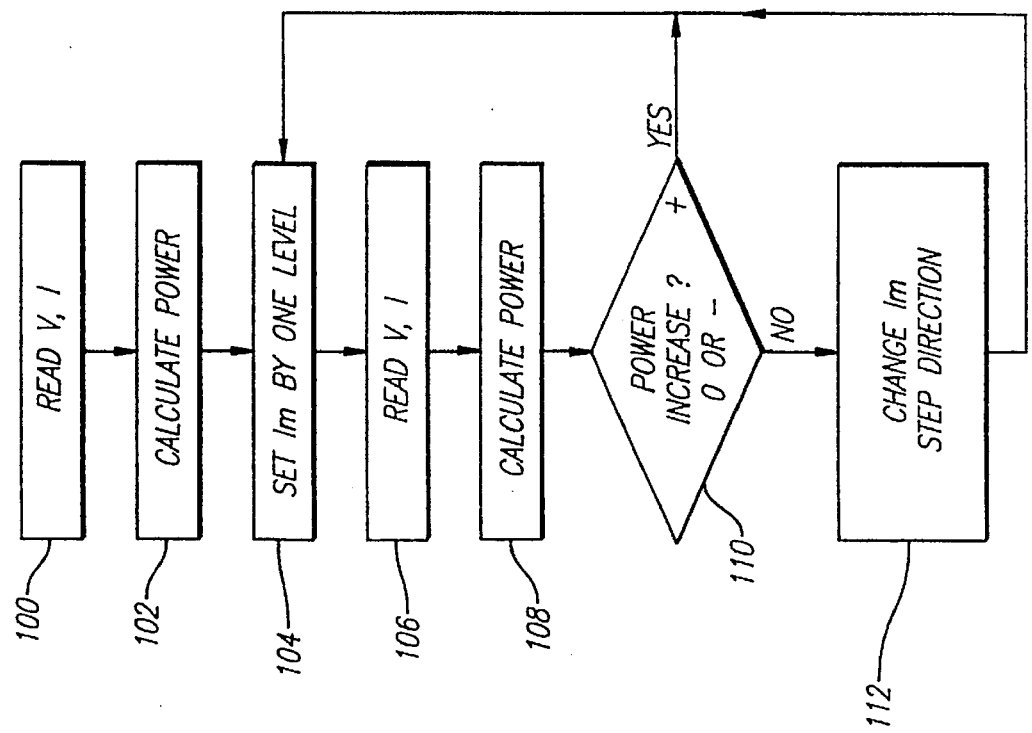
FIG. 4 is a flowchart indicating an algorithm implemented by the controller for determining a maximum current signal.

To set the maximum current pulse, the controller 16 implements an algorithm shown in FIG. 4. In an initial step 100, the controller reads the output voltage (V) and output current (I) of the solar array 12. The controller then, in step 102, calculates the solar array's output power and, in step 104, either steps the maximum current pulse ($I_m$) up or down one level (approximately 0.4%). The controller again reads the solar array's output voltage and output current at step 106 and calculates the new output power at step 108. The controller then proceeds to step 110, where it determines whether the newly calculated power is greater than or less than the previously computed power. If it is greater, the controller returns to step 104 of stepping the level of the maximum current pulse in the same direction. If, on the other hand, it is determined at step 110 that the newly computed output power remains the same or has decreased, the controller proceeds to step 112, where it changes the direction of the current step command, and then returns to step 104 of stepping the level of the maximum current pulse, this time stepping it in the opposite direction.

By way of example, if the combined current draw by the dc-to-dc converters 22 is less than the optimal current for consuming the peak available power from the solar array 12, a step down in the combined current draw will cause a decrease in the solar array's output power whereupon the controller 16 will reverse the direction of the current step. An increase in the combined current draw will increase the solar array's output power and the controller will continue to increase the amplitude maximum current pulse 44 by incremental steps until the output power decreases whereupon the controller will reverse the direction of the current step. If the combined current draw of the dc-to-dc converters is more than the optimal current, then an increase in the combined current draw will cause the solar array's output power to decrease whereupon the controller will reverse the direction of the current step. A decrease in the current draw will cause the solar array's power output to increase. Accordingly, the controller will continue to decrease the current draw until the solar array's output power again starts to decrease.

It should be noted that the amplitude of the maximum current pulse 44 on the control bus 20 never remains constant even though the peak available power from the solar array 12 remains constant. If the system 10 is operating at the optimum point of maximum available power, the controller 16 will increment the amplitude of the current pulse by one step from that point causing a slight reduction in the solar array's output power. In response, the controller will reverse the direction of the increment step of the amplitude of the current pulse and return the system to the point of maximum output power. Since the solar array's output power will increase, the controller will continue in increment the amplitude of the current pulse in the same direction whereupon the solar array's output power will again decrease. Again, in response to the decrease, the controller will reverse the increment direction and so on. Thus, the system will operate within 0.4% of the optimum current and will not increment more than two steps in any one direction unless the available output power of the solar array, and hence the optimum output current, changes. The slight 0.4% fluctuation in the charge current is relatively slow and is not significant in efficiently consuming the maximum available output power.

Figure 5:
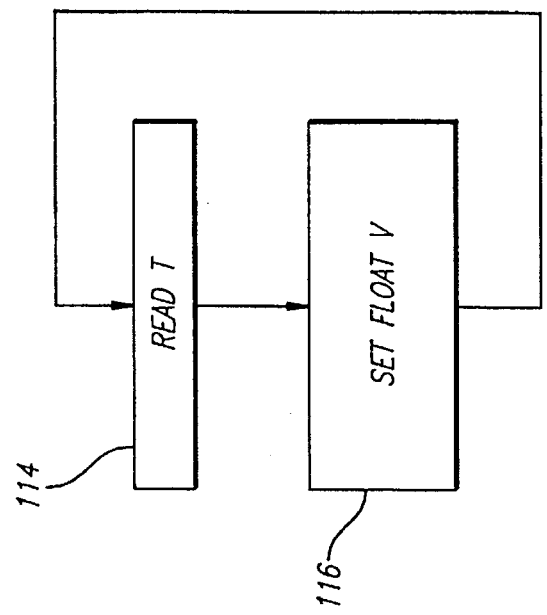
FIG. 5 is a flowchart indicating an algorithm implemented by the controller for determining a float voltage signal.

The algorithm for setting the amplitude of the float voltage pulse 46 is shown in FIG. 5. To implement the algorithm, the controller 16 merely reads the temperature of the thermometer 62, at step 114, and sets the amplitude of the float voltage pulse accordingly, at step 116.

Figure 3:
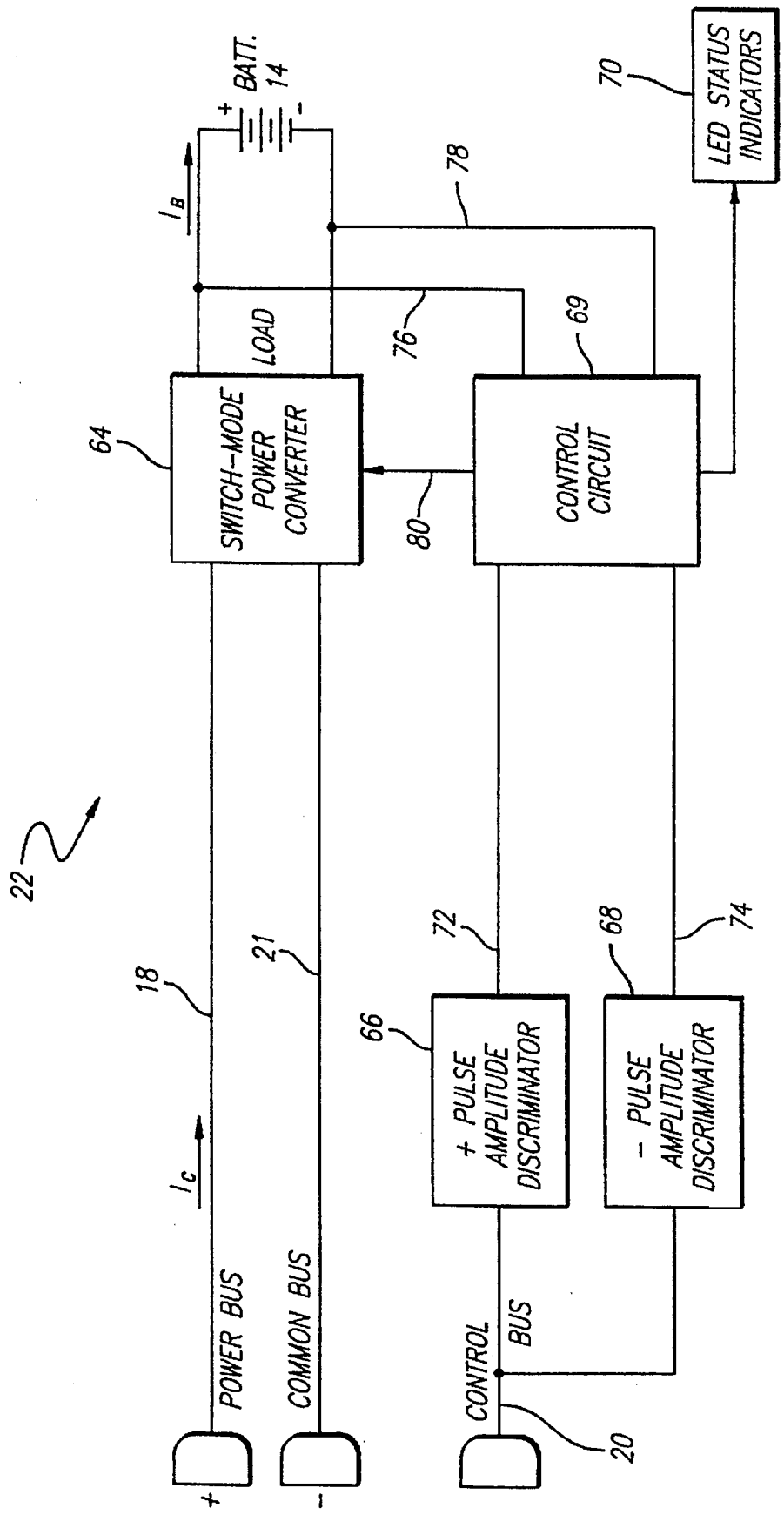
FIG. 3 is a block diagram of one of the dc-to-dc converter of the power conversion system of FIG. 1.

The operation of the dc-to-dc converters 22 is most conveniently understood with reference to FIG. 3. Each dc-to-dc converter draws a current $I_C$ from the power bus 18 at the solar panel's output voltage and supplies a charging current $I_B$ to the battery 14. Each dc-to-dc converter includes a switch-mode power converter 64, positive and negative pulse amplitude discriminators 66 and 68, a control circuit 69, and light-emitting diode (LED) status indicators 70. The switch-mode power converter, using pulse-width modulation, controls the dc-to-dc converter's current draw $I_C$ from the power bus.

The positive pulse amplitude discriminator 66 detects the amplitude of the positive amplitude pulses of the control signal received on the control bus 20 and produces a corresponding float voltage signal for output on line 72. Similarly, the negative pulse amplitude discriminator 68 detects the amplitude of the negative amplitude pulses of the control signal received on the control bus 20 and produces a corresponding maximum current signal for output on line 74. The control circuit 69 receives the first input signal on line 72, for setting the float voltage for the battery 14, and the second input signal on line 74, for setting the maximum current draw from the power bus 18. The control circuit 69 also is connected, via lines 76 and 78, to the battery 14, so that it can measure its voltage level and thereby determine its state of charge. Based on the received float voltage signal and maximum current draw signal, and further based on the battery voltage measurement, the control circuit produces an error signal that is coupled via line 80 to the switch-mode power converter 64. This controls the power converter such that an appropriate current draw from the power bus 18 is maintained.

The maximum current pulse 44 affects only those dc-to-dc converters 22 that are drawing a current $I_C$ above the threshold current set by the amplitude of the maximum current pulse. In other words, lowering the maximum current signal has an effect first on the dc-to-dc converters that are drawing the most current from the power bus 18.

The dc-to-dc converters 22 preferably each have LED status indicators 70 to indicate the battery's charge status. More particularly, the status indicators include three LED's that indicate a charging battery, a full or ready battery, and an open breaker. The open breaker LED indicates if a fuse (not shown) on the power bus 18 has blown.

Each dc-to-dc converter 22 is designed so that an amplitude of the maximum current pulse 44 of zero volts corresponds to maximum current draw from the power bus 18 whereas an amplitude of −5.0 volts corresponds to minimum current draw from the power bus. Accordingly, the failure or removal of the controller 16 from the system 10 likely will cause the control signal to drift to zero volts and thus cause the dc-to-dc converters to draw as much current as each individually can. Likewise, the dc-to-dc converter is configured so that if the amplitude of the float voltage pulse 46 is zero volts, the dc-to-dc converter sets the battery float voltage to a minimum voltage of 12.7 volts. It is recognized that at these voltage and current levels, the dc-to-dc converters will not completely charge their respective batteries 14 and, in combination, most likely will not operate to consume the solar array's maximum available power. However, the system 10 will still function to significantly charge the batteries, even though the controller fails to provide any control signal.

Figure 6:
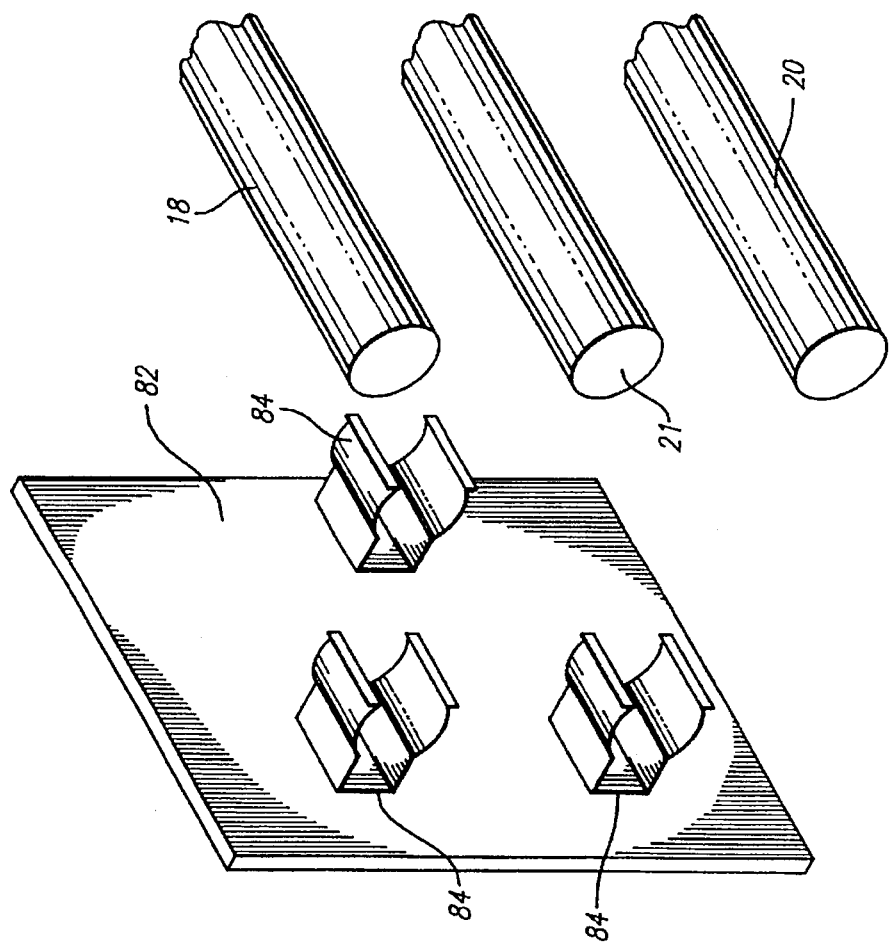
FIG. 6 is a perspective view of an electrical power delivery system of the present invention for providing an electrical connection between the controller and the plurality of the dc-to-dc converters.

A more detailed drawing of the connection of the controller 16 and the dc-to-dc converters 22 to the power bus 18, the control bus 20, and the common bus 21 is provided in FIG. 6. These three buses are shown as solid, spaced-apart rods, preferably of nickel-coated aluminum and having a diameter of ¼ inch. Each dc-to-dc converter is mounted on a separate printed circuit board 82 having three clips 84 arranged in a triangular manner. The clips are aligned with the parallel bus rods such that each clip connects to a different rod. When the printed circuit board is clipped onto the three rods, the triangular spacing of the clips allows the dc-to-dc converter to be held in a stable fashion.

Accordingly, other dc-to-dc converters or other power loads can be added to or removed from the power bus and the control bus in a simple fashion. In addition, the controller 16 will compensate for these new power loads and drive the system such that it draws the peak available power from the solar array. Also, the controller can be mounted on a printed circuit board that also has clips like the printed circuit boards of the dc-to-dc converters to allow simple removal and/or replacement of the controller. Preferably, the clips 84 are each three snap fuse connectors that can handle a nominal current of 30 amps.

It should be recognized that ac motors such as water pump motors can be powered by replacing the dc-to-dc converters 22 discussed above with dc-to-ac converters. The dc-to-ac converter's current draw from the power bus 18 can be varied by changing the converter's ac frequency. In addition, the solar array 12 can be replaced by most any type of power source having an optimum current for producing the maximum output power that is less that the power source's maximum output current.

Figure 7:
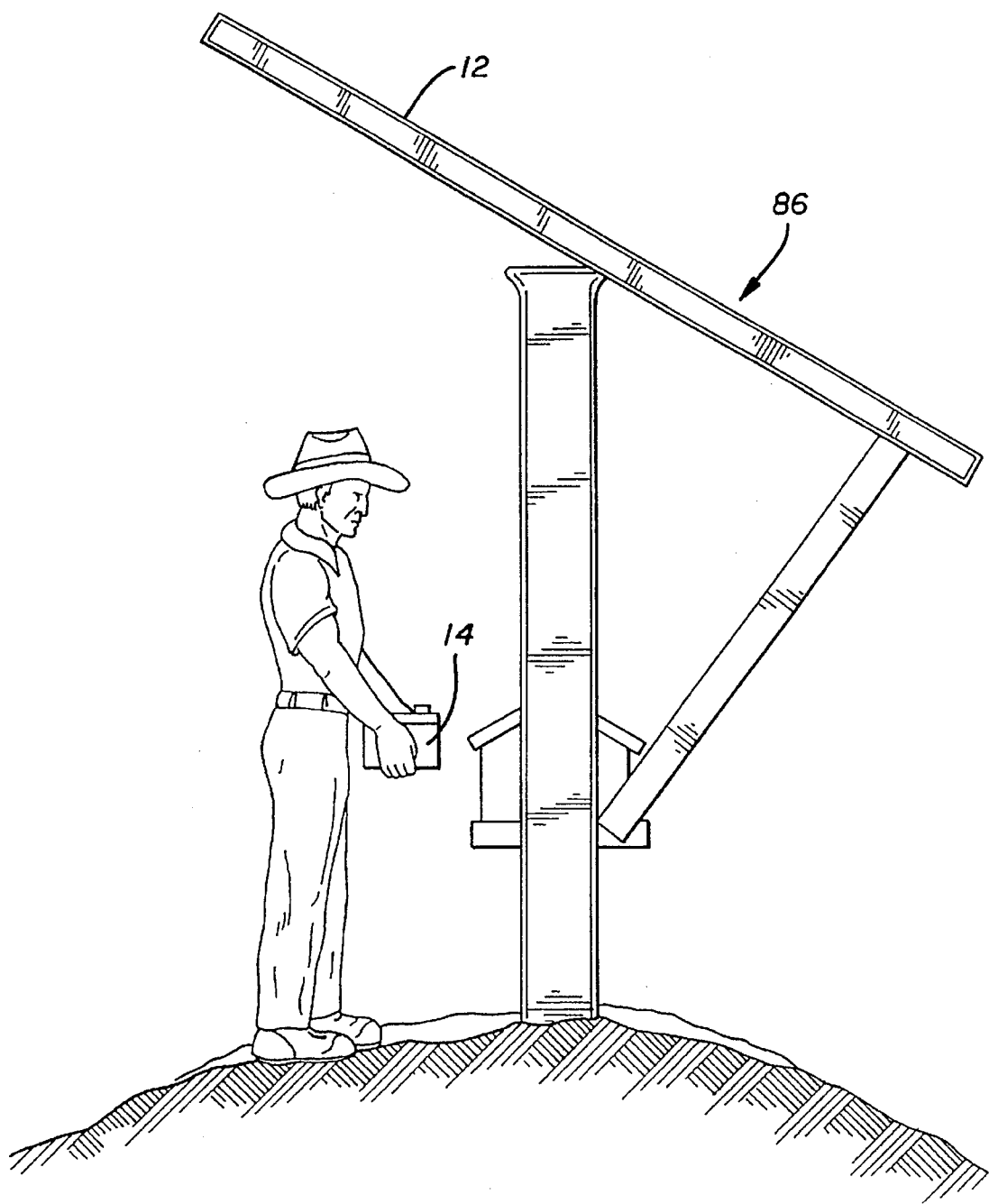
FIG. 7 is an illustration of an individual transporting a rechargeable electrical battery to a battery charging site in accordance with the present invention.

The conversion system 10 of the present invention is particularly advantageous for providing electrical energy to a population in a remote locality not serviced by the power grid of a conventional electrical power utility. As shown in FIG. 7, a battery charging site 86 is provided in the locality. The battery charging site includes the solar array 12, the controller 16, the power, control and common buses 18, 20 and 21, respectively, and the dc-to-dc converters 22. The rechargeable electrical batteries 14 are distributed to individuals living near the charging site who use the batteries at their residences or work sites. After use, the individuals return the batteries to the charging site. As discussed above, the conversion system adjusts the charging rate of the batteries based on the condition of the batteries and the performance of the solar array to optimize the use of electrical energy available from the solar array.

Although the foregoing discloses the preferred embodiments of the present invention, it is understood that those skilled in the art may make various changes to the preferred embodiments without departing from the scope of the invention. The invention is defined only by the following claims.

We claim:

1. An electrical power conversion system for delivering the maximum available output power to a plurality of electrical power loads from a power source that has an output power that varies with changes in the output current of the power source such that the output power from the power source peaks at an optimum current that is less than the maximum available output current of the power source, comprising:

a voltage sensor that generates an output voltage signal based on the output voltage of the power source;

a current sensor that generates an output current signal based on the output current of the power source;

a controller that calculates the output power of the power source based on the output voltage signal and the output current signal and generates a current control signal associated with the calculated output power; and a plurality of electrical power converters associated with the plurality of power loads, each power converter receiving the current control signal and drawing current from the power source in accordance with a predetermined current limit set by the current control signal;

wherein the controller tracks a peak in the available output power of the power source and sets the predetermined current limit of the current control signal such that the combined current draw of the plurality of power converters is substantially equal to the optimum current, thereby allowing the power converters, in combination, to consume the maximum available power from the power source.

2. An electrical power conversion system as defined in claim 1, further comprising:

a temperature sensor that generates a temperature signal based on the temperature of the plurality of electrical power loads;

wherein the controller generates a voltage control signal based on the temperature signal; and wherein the plurality of converters set a load voltage for the converters' respective power loads based on the voltage control signal.

3. An electrical power conversion system as defined in claim 2, wherein the controller combines the voltage control signal and the current control signal to form a bi-phase pulse control signal, and wherein the load voltage is represented by the amplitude of a first polarity of the bi-phase pulse control signal and the predetermined current limit is represented by the amplitude of a second signal polarity of the bi-phase pulse control signal.

4. An electrical power conversion system as defined in claim 1, wherein the plurality of power converters are dc-to-dc converters.

5. An electrical power conversion system as defined in claim 1, wherein the predetermined limit of the current control signal represents a current threshold and wherein each of the plurality of power converters reduces its current draw from the power source if the current draw of the respective power converter is greater than the current threshold.

6. An electrical power conversion system as defined in claim 1, further comprising:

a power bus that transmits the output power from the power source to the plurality of power converters;

a control bus that transmits the current control signal from the controller to the plurality of power converters; and a common bus that provides a return for the power bus and the control bus;

wherein the power bus, control bus, and common bus are spaced apart from each other such that they are parallel and coplanar.

7. An electrical power conversion system as defined in claim 6, wherein the controller includes a planar circuit board having first, second, and third clips on one side that are spaced apart in a triangular configuration to be engageable with the power bus, the control bus, and the common bus.

8. An electrical power conversion system as defined in claim 6, wherein each of the plurality of power converters includes a planar circuit board having first, second, and third clips on one side that are spaced apart in a triangular configuration to be engageable with the power bus, the control bus, and the common bus.

9. An electrical power conversion system as defined in claim 1, wherein:

the controller is configured to periodically increment or decrement the current control signal, each time calculating the resulting output power of the power source and determining if the output power increased or decreased from the output power calculated immediately previously;

the controller increments the current control signal if it immediately previously incremented the current control signal and the resulting output power was determined to increase or if it immediately previously decremented the current control signal and the resulting output power was determined to decrease; and the controller decrements the current control signal if it immediately previously decremented the current control signal and the resulting output power was determined to increase or if it immediately previously incremented the current control signal and the resulting output power was determined to decrease.

10. An electrical power delivery system for delivering electrical power and a control signal from a power source to a plurality of power loads comprising:
 a power bus that transmits electrical power from the power source to the plurality of power loads;
 a control bus that transmits a control signal from the power source to the plurality of power loads;
 a common bus that provides a return for the power bus and the control bus;
 wherein the power bus, control bus, and common bus are spaced apart from each other such that they are parallel and coplanar with each other; and
 a plurality of planar circuit boards, each circuit board associated with a separate one of the plurality of power loads, and each having first, second, and third clips on one side that are spaced apart in a triangular configuration and engageable with the power bus, the control bus, and the common bus.

11. A method of delivering the maximum available output power to a plurality of electrical power loads from a power source that has an output power that varies with changes in the output current of the power source such that the output power from the power source peaks at an optimum current that is less than the maximum available output current of the power source, comprising:
 generating an output voltage signal based on the output voltage of the power source;
 generating an output current signal based on the output current of the power source;
 providing a plurality of electrical power converters associated with the plurality of power loads, each power converter drawing current from the power source in accordance with a current control signal; and
 tracking a peak in the available output power of the power source by calculating the output power of the power source based on the output voltage signal and the output current signal and setting the current control signal such that the combined current draw of the plurality of power converters is substantially equal to the optimum current, thereby allowing the power converters, in combination, to consume the maximum available power from the power source.

12. A method of delivering the maximum available output power as defined in claim 11, further comprising:
 generating a temperature signal based on the temperature of the plurality of electrical power loads;
 generating a voltage control signal based on the temperature signal; and
 causing the plurality of power converters to set a load voltage for the converters' respective power loads based on the voltage control signal.

13. A method of delivering the maximum available output power as defined in claim 12, further comprising:
 combining the voltage control signal and the current control signal to form a bi-phase pulse control signal, wherein the load voltage is represented by the amplitude of a first polarity of the bi-phase pulse control signal and the predetermined current that is represented by the amplitude of a second polarity of the bi-phase pulse control signal.

14. A method of delivering the maximum available output power as defined in claim 11, wherein the plurality of power converters are dc-to-dc converters.

15. A method of delivering the maximum available output power as defined in claim 11, wherein the predetermined limit of the current control signal represents a current threshold and wherein each of the plurality of power converters reduces its current draw from the power source if the current draw of the respective power converter is greater than the current threshold.

16. A method of delivering the maximum available power as defined in claim 10, wherein tracking includes:
 periodically incrementing or decrementing the current control signal, each time calculating the resulting output power of the power source and determining if the output power increased or decreased from the output power calculated immediately previously;
 the current control signal is incremented if it immediately previously had been incremented and the resulting output power was determined to increase or if it immediately previously had been decremented and the resulting output power was determined to decrease; and
  1. The current control signal is decremented if it immediately previously had been decremented and the resulting output power was determined to increase or if it immediately previously had been incremented and the resulting output power was determined to decrease.

17. An electrical power system for delivering electrical energy to a plurality of electrical power loads, comprising:
 a solar electrical power source that has an electrical output power that varies with changes in the output current of the power source such that the output power from the power source peaks at an optimum current that is less than the maximum available output current of the power source;
 a voltage sensor that generates an output voltage signal based on the output voltage of the power source;
 a current sensor that generates an output current signal based on the output current of the power source;
 a controller that calculates the output power of the power source based on the output voltage signal and the output current signal and generates a current control signal associated with the calculated output power; and
 a plurality of electrical power converters associated with the plurality of power loads, each power converter receiving the current control signal and drawing current from the power source in accordance with a predetermined current limit set by the current control signal;
 wherein the controller tracks a peak in the available output power of the power source and sets the predetermined current limit of the current control signal such that the combined current draw of the plurality of power converters is substantially equal to the optimum current, thereby allowing the power converters, in combination, to consume the maximum available power from the power source.

18. A method of delivering electrical energy to a plurality of electrical power loads, comprising:
 providing a solar electrical power source that has an electrical output power that varies with changes in the output current of the power source such that the output power from the power source peaks at an optimum current that is less than the maximum available output current of the power source;

generating an output voltage signal based on the output voltage of the power source;

generating an output current signal based on the output current of the power source;

providing a plurality of electrical power converters associated with the plurality of power loads, each power converter drawing current from the power source in accordance with a current control signal; and tracking a peak in the available output power of the power source by calculating the output power of the power source based on the output voltage signal and the output current signal and setting the current control signal such that the combined current draw of the plurality of power converters is substantially equal to the optimum current, thereby allowing the power converters, in combination, to consume the maximum available power from the power source.

* * * * *